Aug. 7, 1934. T. MIDGLEY, JR., ET AL Re. 19,265
HEAT TRANSFER
Original Filed Feb. 8, 1930
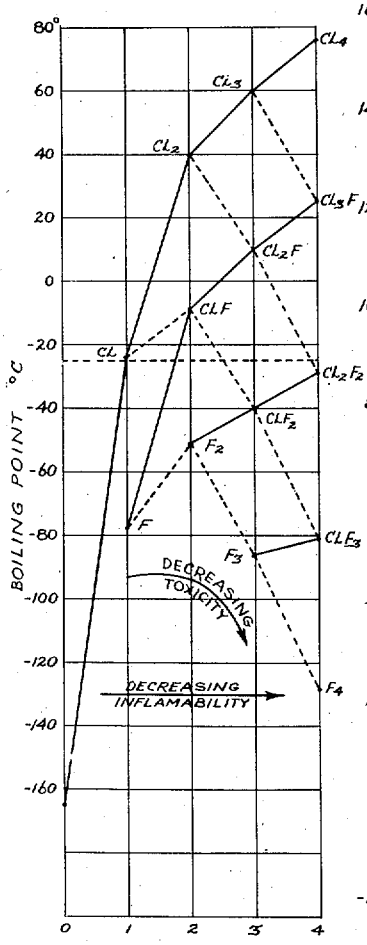
Fig. 1
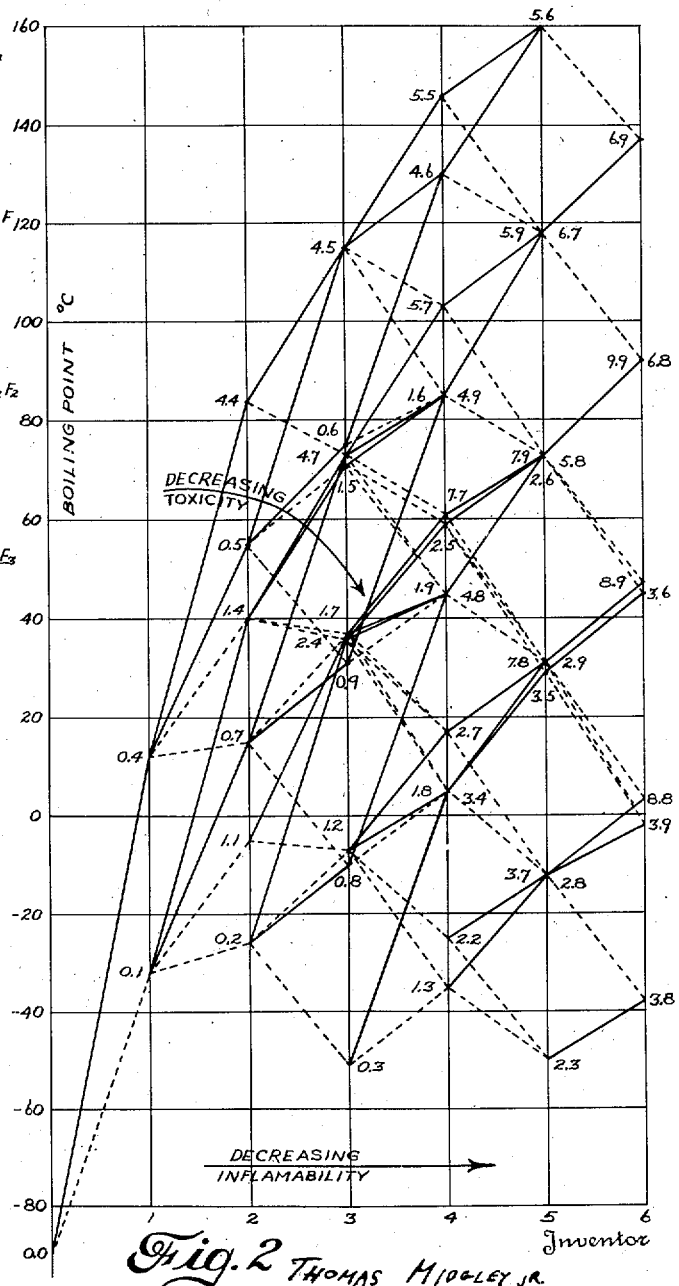
Fig. 2
0 = $CH_3$
1 = $CH_2F$
2 = $CHF_2$
3 = $CF_3$
4 = $CH_2CL$
5 = $CHCL_2$
6 = $CCL_3$
7 = CHCLF
8 = $CCLF_2$
9 = $CCL_2F$
key to Fig. 2
Fig 3
Inventor
THOMAS MIDGLEY JR.
ALBERT L. HENNE
ROBERT R. McNARY
By Spencer Hardman & Fehr
Attorney Reissued Aug. 7, 1934

Re. 19,265

UNITED STATES PATENT OFFICE 19,265

HEAT TRANSFER

Thomas Midgley, Jr., Worthington, Albert L. Henne, Columbus, and Robert R. McNary, Dayton, Ohio, assignors, by mesne assignments, to General Motors Corporation, a corporation of Delaware Original No. 1,833,847, dated November 24, 1931, Serial No. 426,974, February 8, 1930. Application for reissue May 28, 1934, Serial No. 728,046

24 Claims. (Cl. 62—178)

This application relates to the art of transferring heat from one point to another and specifically to the art of refrigeration.

Heretofore, as far as we are aware, refrigerants and heat transfer agents have been chosen chiefly for their boiling points and stability in the refrigerating or heat transfer cycle irrespective of other desirable properties, such as non-inflammability and non-toxicity.

It is the object of our invention, on the other hand, to provide a process of refrigeration and, generically, a process of heat transfer in which these desirable properties, such as non-inflammability and non-toxicity, are obtained in combination with the desired boiling points.

Broadly stated, the part of our process which deals with the controlling of the properties of the refrigerating or heat transfer agents consists in replacing hydrogen by fluorine or other halogen, or both, in aliphatic hydrocarbons in which at least one hydrogen has already been replaced by fluorine.

Broadly stated, the part of our process which relates to the transfer of heat or the production of refrigeration comprises changing the physical state of, for example, by condensing or evaporating, a halo-fluoro derivative of an aliphatic hydrocarbon, and dissipating to, or withdrawing from, an object to be heated or cooled, the latent heat necessary for changing the physical state of the said derivative. By a halo-fluoro derivative of an aliphatic hydrocarbon we mean a derivative containing more than one fluorine atom with or without other halogen atoms, or one fluorine atom with one or more other halogen atoms.

Referring now specifically to our mode of controlling the properties of the refrigerating or heat transfer agent, aliphatic monofluorides form the structural nucleus on which the agents are built. Broadly speaking, if in the structural formula $CH_3F$ we increase the fluorine content (number of atoms) by the substitution of fluorine for hydrogen, stability increases, inflammability decreases, and toxicity decreases. If we keep the fluorine content constant and substitute another halogen for hydrogen in the nucleus, the boiling point increases, the stability decreases, the toxicity increases, and the inflammability decreases. The degree to which these variations take place depends on what the other halogen (chlorine, bromine, or iodine) is. As the ratio of the halogen content to the hydrogen content increases the inflammability decreases.

Because there are several variables, and because of the value of relative proportions, we have placed the compounds of the group discussed on plots wherein Fig. 1 is a plot applying the rules of substitution to typical groups having one carbon atom, Fig. 2 is a plot applying the rules to groups having two carbon atoms, and Fig. 3 is a key to Fig. 2, showing the radicals corresponding to the numbers used in Fig. 2.

Referring to the plots generally, the dashed lines indicate fluorine substitutions and the solid lines indicate chlorine substitutions. Similar plots are obtained with bromine and iodine in place of chlorine except that the plot is elongated in the direction of higher temperatures with bromine, while with iodine the temperatures are still more elevated. The amount of elongation is readily determined by applying the boiling points of some of these compounds.

Referring specifically to Fig. 1, this plot contains all the compounds which can be derived from $CH_3F$ by chlorine and/or fluorine substitutions, together with data which assist in the formation of the plot. On the base line appear the numerals zero to four which show halogen content, and the vertical line gives the approximate boiling points in degrees centigrade. At each point of intersection is given the chlorine and fluorine content and the complete formula of the corresponding compound is found by making this halogen substitution for hydrogen in the formula $CH_4$. We have drawn a horizontal dashed line at about −25° centigrade to indicate approximately the optimum vapor pressure conditions which we desire for operating an air cooled refrigerator. It is obvious that one may deviate more or less from this line to obtain optimum conditions which include some other factors, so that within the neighborhood of this line we can provide a suitable refrigerant to meet a wide variation in limitations imposed. If under other refrigerating conditions another optimum line is found desirable, the same choice may be made in the neighborhood of that line. In fact, the actual operation of the refrigerator and the providing of the characteristics of the refrigerant are here combined as one problem so as to obtain the most desirable process of refrigeration under a given set of conditions.

In Figure 2 we have shown the same mode of controlling the properties of a refrigerant carried to compounds of the same type as in Figure 1 but having two carbon atoms. The key to the chart is given in Fig. 3. For example compound 0.1 is $CH_3.CH_2F$, compound 2.9 is $CHF_2CCl_2F$, compound 1.5 is $CH_2F.CHCl_2$, and compound 2.2 is $CHF_2.CHF_2$.

When we choose as our nucleus a compound having two or more carbons atoms we find that the structural formula gives a choice as to where the substitutions of the halogens shall be made. For example, the structural formula of $C_2H_5F$ is $CH_3—CH_2F$, which has a boiling point at about −32° C. If we make a fluorine substitution for hydrogen in the second radical of this structural formula so that it reads $CH_3—CHF_2$ we have a refrigerating agent whose boiling point is about −26° C. If we make the fluorine substitution for hydrogen onto the other carbon atom so that the formula reads $CH_2F—CH_2F$ the boiling point of this refrigerant is about −5° C. Thus, the first type of substitution yields a compound boiling substantially lower than the compound obtained by the second type of substitution, and the chart shows this to be general. The substitution of chlorine, bromine, or iodine for hydrogen raises the boiling point, but the substitution in a radical which does not already contain a halogen raises the boiling point more than when the substitution is made in a radical which already contains a halogen.

The plot may be expanded in like manner with other aliphatic mono-fluorides. As the number of carbon atoms increases the complexity and extent of the plot will increase together with the number of halogens present. These halogen derivatives of aliphatic mono-fluorides may be represented by the formula $C_nH_mF_pX_r$ in which C represents carbon and $n$ the number of carbon atoms in the molecule which is always equal to one or more.

H represents hydrogen and $m$ the number of atoms thereof, which may equal zero and still fulfill the requirements of our invention.

F represents fluorine and $p$ the number of atoms thereof which is always equal to one or more.

X represents chlorine, bromine or iodine or combinations thereof and $r$ the total number of such atoms. $r$ may be zero when $p$ is greater than one.

Among the chemical groups that these refrigerants fall in are halogen derivatives of aliphatic mono fluorides, halogen derivatives of alkyl mono fluorides, aliphatic fluoro halides, alkyl fluro halides, fluoro derivatives of methyl fluoride, fluoro halo derivatives of methane and fluoro chloro derivatives of methane.

Thus by our mode of making fluorine and/or other halogene substitution in a mono-fluoride, we can meet any conditions of refrigeration and provide our refrigerant with the desired properties, such as non-toxicity and non-inflammability, along with such properties as stability and proper boiling points.

Referring more specificaly to the part of our process which relates to the actual transfer of heat, we accomplish this transfer of heat by changing the physical state, of the refrigerant, for example, by condensing or evaporating our aliphatic hydrocarbon derivative which contains more than one fluorine atom with or without other halogen atoms, or one fluorine atom with one or more other halogen atoms, and by dissipating to or withdrawing from an object to be heated or cooled, the heat necessary for the change in physical state. More specifically, to produce refrigeration, we may evaporate the desired derivative in the vicinity of a body to be cooled, while if a heating effect is desired, we may condense the derivative in the vicinity of a body to be heated, it being understood, of course, that the terms "evaporation" and "condensation' include the separation of a gas from, and the absorption of a gas in, an absorbent respectively.

Our invention will probably find its greatest utility by adjusting both the mode of preparing the refrigerant to obtain desirable characteristics and the mode of using the refrigerant to obtain a process of refrigeration or heat transfer which meets the limitations imposed. We prefer to employ refrigerants boiling above −60° C.

Obviously our invention is not limited in its application to any specific form of apparatus for carrying out the mode of operation described and it will not be necessary for a complete understanding of the invention to show a specific embodiment of apparatus. Nor is the present invention limited to the examples set forth for a particular advance of the present invention resides in the fact that a great number of new refrigerants with graduated properties is rendered available, and that one is accordingly enabled to secure the most suitable refrigerant for varied purposes.

We claim:—

1. The process of refrigeration which comprises condensing a halogen derivative of an aliphatic mono fluoride and then evaporating the said derivative in the vicinity of a body to be cooled.

2. The process of refrigeration which comprises condensing a halogen derivative of an alkyl mono fluoride and then evaporating the said derivative in the vicinity of a body to be cooled.

3. The process of refrigeration which comprises condensing a halogen derivative of methyl fluoride and then evaporating the said derivative in the vicinity of a body to be cooled.

4. The process of refrigeration which comprises condensing a fluoro-halo derivative of methane and then evaporating the said derivative in the vicinity of a body to be cooled.

5. The process of refrigeration which comprises condensing a fluoro-chloro derivative of methane and then evaporating the said derivative in the vicinity of a body to be cooled.

6. The process of refrigeration which comprises condensing difluoro-dichloro methane and then evaporating it in the vicinity of a body to be cooled.

7. The process of refrigeration which comprises condensing a fluoro halo derivative of an aliphatic hydrocarbon and then evaporating the said derivative in the vicinity of a body to be cooled.

8. The process which comprises substituting halogen for hydrogen in an aliphatic monofluoride to thereby obtain a heat transfer agent having predetermined requirements of vapor pressure, toxicity, and inflammability, evaporating the heat transfer agent and condensing the evaporated agent.

9. The process which comprises substituting halogen for hydrogen in an aliphatic monofluoride to thereby obtain a refrigerant having predetermined requirements of vapor pressure, toxicity, and inflammability, evaporating the said refrigerant and condensing the evaporated refrigerant.

10. The process of producing refrigeration which comprises condensing a fluoro-chloro derivative of an aliphatic hydrocarbon and then evaporating the said derivative in the vicinity of a body to be cooled.

11. The process of producing refrigeration which comprises condensing a fluoro-bromo derivative of an aliphatic hydrocarbon and then evaporating the said derivative in the vicinity of a body to be cooled.

12. The process of refrigeration which comprises condensing a bromo-fluoro derivative of methane and then evaporating the said derivative in the vicinity of a body to be cooled.

13. The process of refrigeration which comprises condensing monofluoro-dichloro methane and then evaporating it in the vicinity of a body to be cooled.

14. The process of refrigeration which comprises condensing a fluoro-halo derivative of ethane and then evaporating the said derivative in the vicinity of a body to be cooled.

15. The process of refrigeration which comprises condensing a fluoro-chloro derivative of ethane and then evaporating the said derivative in the vicinity of a body to be cooled.

16. The process of refrigeration which comprises condensing a fluoro-bromo derivative of ethane and then evaporating the said derivative in the vicinity of a body to be cooled.

17. The process of refrigeration which comprises condensing tetrafluoro-dichloro ethane and then evaporating it in the vicinity of a body to be cooled.

18. The process of refrigeration which comprises condensing difluoro-tetrachloro ethane and then evaporating it in the vicinity of a body to be cooled.

19. The process of transferring heat which comprises condensing a fluoro-halo derivative of an aliphatic hydrocarbon and evaporating the said derivative.

20. The process of transferring heat which comprises condensing a fluoro-chloro derivative of an aliphatic hydrocarbon and evaporating the said derivative.

21. The process of transferring heat which comprises condensing a halo-fluoro derivative of methane and evaporating the said derivative.

22. The process of transferring heat which comprises condensing a chloro-fluoro derivative of methane and evaporating the said derivative.

23. The process of transferring heat which comprises condensing a halo-fluoro derivative of ethane and then evaporating the said derivative.

24. The process of transferring heat which comprises condensing a chloro-fluoro derivative of ethane and then evaporating the said derivative.

THOMAS MIDGLEY, JR.
ALBERT L. HENNE.
ROBERT R. McNARY.